(12) United States Patent
Jeong et al.

(10) Patent No.: US 11,445,144 B2
(45) Date of Patent: Sep. 13, 2022

(54) ELECTRONIC DEVICE FOR LINKING MUSIC TO PHOTOGRAPHY, AND CONTROL METHOD THEREFOR

(71) Applicant: SAMSUNG ELECTRONICS CO., LTD., Suwon-si (KR)

(72) Inventors: Kyuil Jeong, Suwon-si (KR); Benjamin Hubert, London (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 98 days.

(21) Appl. No.: 16/766,547

(22) PCT Filed: Dec. 7, 2018

(86) PCT No.: PCT/KR2018/015515
§ 371 (c)(1),
(2) Date: May 22, 2020

(87) PCT Pub. No.: WO2019/132306
PCT Pub. Date: Jul. 4, 2019

(65) Prior Publication Data
US 2020/0329211 A1     Oct. 15, 2020

(30) Foreign Application Priority Data
Dec. 29, 2017   (KR) .................. 10-2017-0184432

(51) Int. Cl.
*H04N 5/92*     (2006.01)
*G06V 40/16*   (2022.01)
(Continued)

(52) U.S. Cl.
CPC ............ *H04N 5/92* (2013.01); *G06V 40/172* (2022.01); *H04N 5/232939* (2018.08); *G06F 3/0482* (2013.01)

(58) Field of Classification Search
CPC ............... H04N 5/92; H04N 5/232939; G06K 9/00288; G06F 3/0482
See application file for complete search history.

(56) References Cited

U.S. PATENT DOCUMENTS 8,922,620 B2   12/2014  Kim et al.
10,339,176 B2   7/2019  Kim
(Continued)

FOREIGN PATENT DOCUMENTS

JP   2000-76542 A    3/2000
JP   2001-292299 A  10/2001
(Continued)

OTHER PUBLICATIONS

Communication dated Apr. 9, 2021, from Intellectual Property India in Indian Application No. 202017022978.
(Continued)

*Primary Examiner* — Christopher K Peterson
(74) *Attorney, Agent, or Firm* — Sughrue Mion, PLLC

(57) ABSTRACT

The present invention relates to a content producing device and method for matching and storing music information when an electronic device captures an image and, particularly, to a content producing device and method for storing, together with a captured image, information on music played by an electronic device or around the electronic device when the image is captured. According to one embodiment of the present disclosure, a control method for an electronic device comprises the steps of: capturing an image when a photographing instruction is inputted by a user; acquiring, during capturing of the image, sound source information on music played in a space in which the electronic device is located; and matching the sound source information on music to the captured image and storing the same.

17 Claims, 9 Drawing Sheets

(51) Int. Cl.
*H04N 5/232* (2006.01)
*G06F 3/0482* (2013.01)
*H04N 1/32* (2006.01)
*H04N 5/77* (2006.01)
*H04N 9/82* (2006.01)
*H04N 21/431* (2011.01)
*H04N 21/4722* (2011.01)
*H04N 21/858* (2011.01)

(56) References Cited

U.S. PATENT DOCUMENTS

| | | | |
|---|---|---|---|
| 2009/0125136 | A1 | 5/2009 | Akiyama |
| 2013/0055300 | A1 | 2/2013 | Hanina |
| 2013/0211889 | A1 | 8/2013 | Hanina et al. |
| 2014/0161263 | A1* | 6/2014 | Koishi ............... G06F 16/683 381/56 |
| 2014/0192230 | A1* | 7/2014 | Chang ............... H04N 1/32101 348/231.4 |
| 2016/0132533 | A1 | 5/2016 | Kim |
| 2017/0134688 | A1 | 5/2017 | Yoon et al. |
| 2017/0154220 | A1 | 6/2017 | Chen et al. |
| 2018/0376121 | A1* | 12/2018 | Wang ............... H04N 5/232939 |

FOREIGN PATENT DOCUMENTS

| | | |
|---|---|---|
| JP | 2005-50315 A | 2/2005 |
| JP | 2006-109151 A | 4/2006 |
| JP | 2009-117973 A | 5/2009 |
| JP | 2015-219717 A | 12/2015 |
| JP | 6038256 B2 | 12/2016 |
| KR | 10-2011-0036438 A | 4/2011 |
| KR | 10-2011-0097151 A | 8/2011 |
| KR | 10-2014-0059529 A | 5/2014 |
| KR | 10-2015-0056160 A | 5/2015 |
| KR | 10-2015-0121889 A | 10/2015 |
| KR | 10-2017-0024866 A | 3/2017 |
| KR | 10-2017-0054868 A | 5/2017 |
| KR | 10-1777354 B1 | 9/2017 |

OTHER PUBLICATIONS

Search Report (PCT/ISA/210) dated Mar. 7, 2019 for International Application No. PCT/KR2018/015515.
Written Opinion (PCT/ISA/237) dated Mar. 7, 2019 for International Application No. PCT/KR2018/015515.
Communication dated Jan. 13, 2022 issued by the Korean Intellectual Property Office in Korean English Application No. 10-2017-0184432.
Communication dated Apr. 25, 2022, issued by the German Patent and Trademark Office in German Patent Application No. 112018006727.0.
Communication dated Apr. 27, 2022, issued by the China National Intellectual Property Administration in Chinese Application No. 201880083517.8.
Communication dated Jul. 11, 2022, issued by the Korean Intellectual Property Office in Korean Patent Application No. 10-2017-0184432.

* cited by examiner

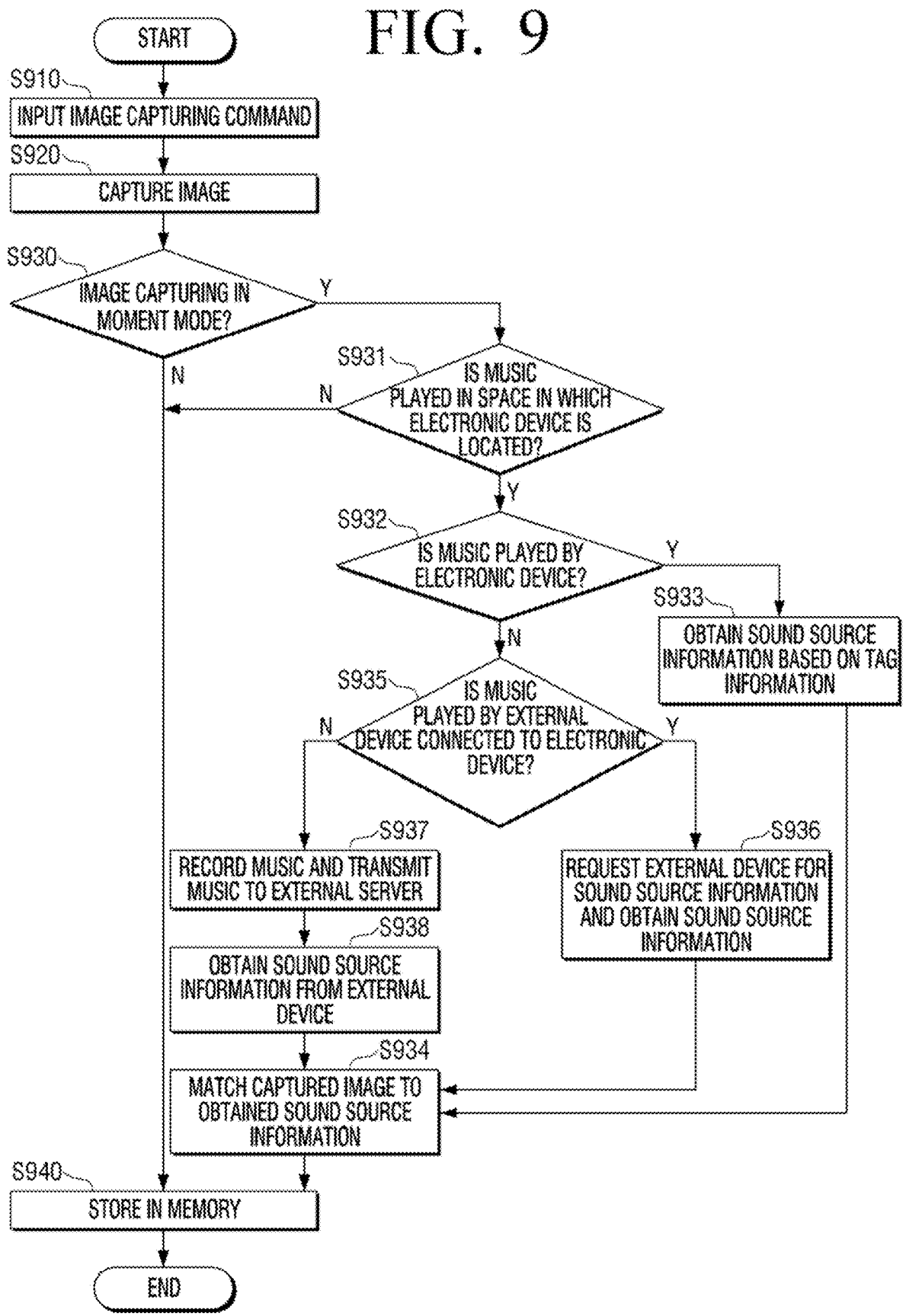

ELECTRONIC DEVICE FOR LINKING MUSIC TO PHOTOGRAPHY, AND CONTROL METHOD THEREFOR

TECHNICAL FIELD

The disclosure relates to a content producing device and a method for matching and storing music information when an electronic device captures an image and, particularly, to a content producing device and a method for storing, together with a captured image, information on music played by an electronic device or around the electronic device when the image is captured.

BACKGROUND ART

Along with the development of electronic technologies, technologies of providing lots of contents using various electronic devices have also been continuously developed. Among these, a technology of, when an image is captured using an electronic device that is able to capture an image, for example, a smartphone, recording a sound generated around the smartphone and storing the sound with the image has emerged recently. If a user reproduces the image later, the content stored as described above may provide the image together with the sound generated around the smartphone at the time of the image capturing.

When a user wishes to listen music again that a user listened when capturing an image of a party or a memorable event, a user may not remember the music.

Accordingly, there was inconvenience for a user regarding time and effort required to search for information on the music and the existing electronic device has not suggested any solution to such a problem described above.

DISCLOSURE

Technical Problem

The disclosure has been made to solve the aforementioned problems, and an object of the disclosure is to provide a content image with which music at the time of image capturing is able to be found later by a user without any effort, by storing information on music listened at the time of image capturing together with the image.

Technical Solution

According to an embodiment of the disclosure, an image processing method of the display apparatus includes analyzing a plurality of image frames constituting a virtual reality image and determining shake information of a camera which photographs the VR image, calculating a shake correction value of an image corresponding to a viewing area of a user from the VR image based on the shake information of the camera, and adjusting the viewing area based on the shake correction value and displaying an According to an embodiment of the disclosure to achieve such an object, there is provided a control method of an electronic device, the method including based on an image capturing command being received from a user, capturing an image, obtaining sound source information on music played in a space in which the electronic device is located while capturing the image, and matching the sound source information on the music to the captured image and storing the captured image and the sound source information.

The obtaining may include, based on the music being music played by the electronic device, obtaining sound source information on the music based on tag information of the music.

The obtaining may include, based on the music being music played by an external device connected to the electronic device, requesting the external device for sound source information on the music, and receiving the sound source information on the music from the external device.

The obtaining may include, based on the music being music played by an external device not connected to the electronic device, recording the music played and transmitting the music to an external server, and based on the external server obtaining sound source information on the music by a sound source recognition technology, receiving the sound source information on the music from the external server.

The method may further include, based on a user command for executing a gallery application being input, executing the gallery application and displaying a UI including an image stored and matched to the sound source information on the music.

The method may further include displaying an indicator for guiding that the sound source information is matched and stored, in one area of the UI including the image stored and matched to the sound source information.

The method may further include, based on a user command for selecting the area displayed with the indicator being input while displaying the UI, displaying an image included in the UI, playing the music based on sound source information on music stored and matched to the image, and based on a user command for selecting an area, in which the indicator is not displayed, being input while displaying the UI, displaying an image included in the UI.

The method may further include, based on a user command for executing a music application being input, executing the music application, and displaying a UI including an image stored and matched to the sound source information on the music.

The method may further include displaying a UI list based on the sound source information on the music, based on a user command for selecting a first UI including a first image stored and matched to sound source information on first music from the UI list being input, playing the first music and displaying the first image, and reproducing a second image of a second UI including the second image stored and matched to the sound source information of the first music sequentially with the first image.

The method may further include recognizing a face of a person included in the image, obtaining social media account information by using the recognized face, and transmitting an image stored and matched to the sound source information on the music to the social media account.

There is provided an electronic device including an input unit, a camera, a memory, and a processor configured to, based on an image capturing command being input from a user via the input unit, control the camera to capture an image, obtain sound source information on music played in a space in which the electronic device is located while capturing the image, match the sound source information on the music to the captured image, and store the captured image and the sound source information in the memory.

The processor may be configured to, based on the music being music played by the electronic device, obtain sound source information on the music based on tag information of music stored in the memory.

The device may further include a communicator including circuitry, and the processor may be configured to, based on the music being music played by an external device connected to the electronic device via the communicator, control the communicator to request the external device for sound source information on the music and receive the sound source information on the music from the external device.

The device may further include a microphone, and the processor may be configured to, based on the music being music played by an external device not connected to the electronic device, control the microphone to record the music played and transmit the music to an external server, and based on the external server obtaining sound source information on the music by a sound source recognition technology, control the communicator to receive the sound source information on the music from the external server.

The device may further include a display, and the processor may be configured to, based on a user command for executing a gallery application being input via the input unit, execute the gallery application and control the display to display a UI including an image stored and matched to the sound source information on the music.

The processor may be configured to control the display to display an indicator for guiding that the sound source information is matched and stored, in one area of the UI including the image stored and matched to the sound source information.

The device may further include a speaker, and the processor may be configured to, based on a user command for selecting the area displayed with the indicator being input while displaying the UI by the display, control the display to display an image included in the UI, control the speaker to play the music based on sound source information on music stored and matched to the image, and based on a user command for selecting an area, in which the indicator is not displayed, being input while the display displays the UI, control the display to display an image included in the UI.

The processor may be configured to control the display to display a UI list based on the sound source information on the music, based on a user command for selecting a first UI including a first image stored and matched to sound source information on first music from the UI list being input, control the speaker to play the first music and control the display to display the first image on the display, and control the display to reproduce a second image of a second UI including the second image stored and matched to the sound source information of the first music on the display sequentially with the first image.

The processor may be configured to display a UI list on the display based on the sound source information on the music, based on a user command for selecting a first UI including a first image stored and matched to sound source information on first music from the UI list being input, control the display to display the first image on the display, control the speaker to play the first music, and control the display to reproduce a second image of a second UI including the second image stored and matched to the sound source information of the first music on the display sequentially with the first image.

The device may further include a communicator including circuitry and an image processor, and the processor may be configured to recognize a face of a person included in the image through the image processor, obtain social media account information from the memory by using the recognized face, and control the communicator to transmit an image stored and matched to the sound source information on the music to the social media account.

Effect of Invention

According to the embodiments of the disclosure, a user may reminisce about the memory while reproducing an image and listening to music later and may easily find information on the music listened at that time without any effort, by matching an image to music listened and storing these when capturing an image of a party or a memorable event.

In addition, it is possible to share the memory at that time since it is possible to easily share the corresponding image with friends joined to the memorable event.

DESCRIPTION OF DRAWINGS

FIG. 9 is a flowchart for describing a method for obtaining sound source information on music by the electronic device in various situations according to an embodiment.

DETAILED DESCRIPTION OF EXEMPLARY EMBODIMENTS

Figure 1:
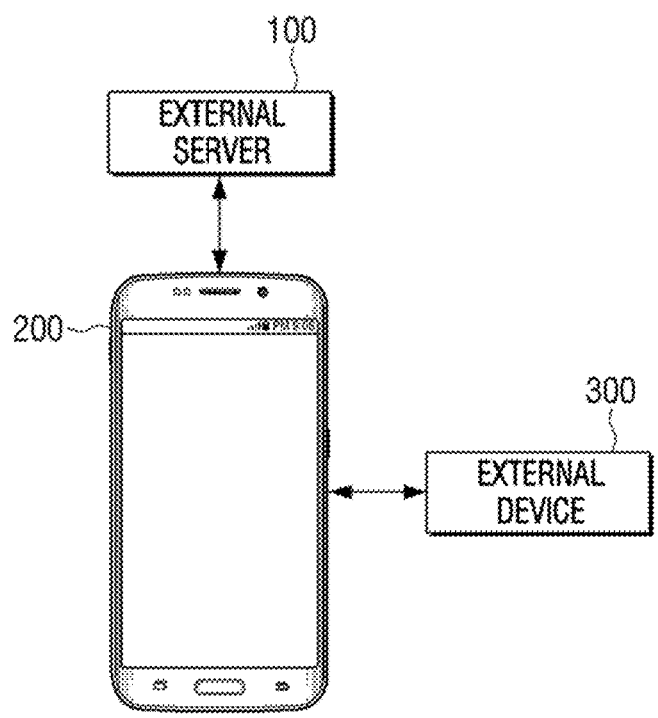
FIG. 1 is a view for describing a system of an electronic device according to an embodiment.

Hereinafter, the disclosure will be described in detail with reference to the drawings. In describing the disclosure, a detailed description of the related art or the configuration is omitted when it is determined that the detailed description may unnecessarily obscure a gist of the disclosure. In addition, the embodiment below can be modified in various different forms and the scope of the technical idea of the disclosure is not limited to the embodiment below. Such embodiments are provided to complete the disclosure and to completely convey the technical idea of the disclosure to those skilled in the art.

In addition, the expression "comprising" a certain element does not mean to exclude other elements, but means to further comprise other elements, unless otherwise noted. Further, various elements and areas in the drawings are schematically shown. Thus, the technical idea of the disclosure is not limited by relative sizes or intervals shown in the accompanying drawings.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of" depending on cases. Meanwhile, the expression "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured (or set) to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Hereinafter, the disclosure will be described in detail with reference to the accompanying drawings.

FIG. 1 is a view for describing a system of an electronic device according to an embodiment of the disclosure.

Referring to FIG. 1, an electronic device system according to an embodiment of the disclosure includes an external server 100, an electronic device 200, and an external device 300.

As shown in FIG. 1, the electronic device 200 may be implemented as a mobile device such as a smartphone, but is not limited thereto, and may be implemented as various devices having a display function such as a PC, a tablet PC, a PMP, a PDA, and the like.

If the electronic device 200 is implemented as a mobile device, the electronic device 200 may be implemented to include a touch screen so as to execute a program by using a finger or a pen (for example, a stylus pen). Hereinafter, for convenience of description, the description will be made by assuming that the electronic device 200 is implemented as a mobile device.

The electronic device 200 may capture an image when image capturing command is input from a user, match information on music played in a space in which the electronic device 200 is located while capturing the image to the captured image, and store these.

If the music played in the space in which the electronic device 200 is located is music played by the electronic device 200 via a streaming account, the electronic device 200 may request the external server 100 for information on a sound source of the music currently played. The electronic device 200 may receive the information on the sound source from the external server 100, match the information to the captured image, and store these.

In addition, if the music played in the space in which the electronic device 200 is located is music played by the external device 300 (e.g., Bluetooth speaker) paired with the electronic device 200, the electronic device 200 may receive the sound source information on the music played from the external server 100 via a streaming account.

If the music played in the space in which the electronic device 200 is located is music played by the external device 300 connected to the electronic device 200, the electronic device 200 may request the external device 300 for sound source information on the music, match the received sound source information to the captured image, and store these.

In addition, if the music played in the space in which the electronic device 200 is located is music played by the external device 300 not connected to the electronic device 200, the electronic device 200 may record the music, transmit the music to the external server 100, and receive information on a sound source obtained by the external server 100 with a sound source recognition technology. The electronic device 200 may match the information on the sound source received through the external server 100 to the captured image and store these.

The information on music may include a date when the music is played, a release date of an album including the music, an album cover, artist information, a title, genre, lyrics, tag information of a memory storing the music, a link address of a server that is able to play the music, and the like. Particularly, the information on music may be information on a specific part of music played at the time of the image capturing. That is, the electronic device 200 may control an audio processor 280 to analyze a waveform (e.g., FFT) of a specific part of the music played at the time of the image capturing.

The electronic device 200 may reproduce an image stored in a memory 210 according to a user command by matching the image to the sound source information on the music. Specifically, the electronic device 200 may control a display 225 to display a UI including the image matched to the sound source information and an indicator, and the electronic device 200 may reproduce music and an image corresponding to the stored sound source information, when a user command for selecting a part corresponding to the indicator is input. An embodiment in which the electronic device 200 reproduces the stored image will be described in detail with reference to FIGS. 5 and 6.

Figure 2:
FIG. 2 is a brief block diagram showing a configuration of the electronic device according to an embodiment.

FIG. 2 is a brief block diagram showing a configuration of the electronic device according to an embodiment of the disclosure.

Referring to FIG. 2, the electronic device 200 may include the memory 210, a camera 220, and a processor 230.

The camera 220 may capture an image. The image means all types of contents which may be captured by the camera 220. Specifically, the image may be various contents such as a photo, a video, a panoramic picture, and a wide shot. In addition, the image may be an animated GIF file in a GIF format.

The memory 210 may store images captured by the camera 220 and various contents and programs. Specifically, the memory 210 may store a content obtained by matching the captured image to sound source information on music played in the space in which the electronic device 200 is located at the time of the image capturing. In addition, the memory 210 may store personal information of friends of a user. The personal information may include contact information, personal information matched to contact information, information on a social media account, face recognition information to be used in face recognition, and the like. Particularly, the memory 210 may store music that may be played by the electronic device 200 and store sound source information on the music. The configuration of the memory 210 will be additionally descried in detail with reference to FIG. 3.

The processor 230 may execute general functions of the electronic device 200.

Specifically, when an image capturing command is received from a user, the processor 230 may control the camera 220 to capture an image and may obtain sound source information on music played in the space in which the electronic device 200 is located while capturing the image.

A method for obtaining the information on the music by the processor 230 may change depending on whether the music is played by the electronic device 200 or the external device 300. In addition, even if the music is played by the external device 300, the method may also change depending on whether the external device 300 is the external device 300 connected to the electronic device 200 or the external device 300 not connected thereto. This will be described in more detail with reference to FIG. 3.

FIG. 2 shows essential components necessary for describing the embodiment of the disclosure, but the electronic device of FIG. 1 may be implemented as various types of devices.

Figure 3:
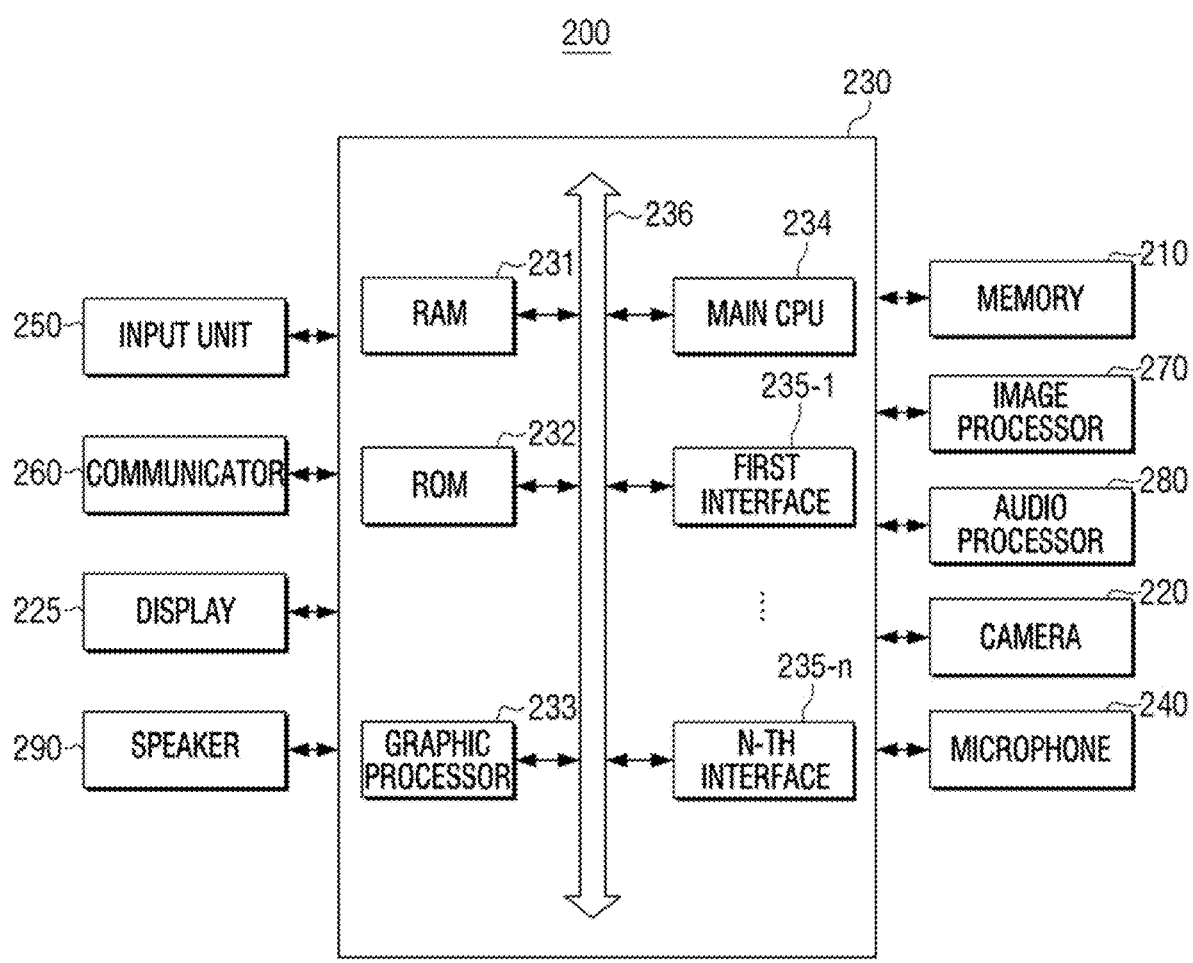
FIG. 3 is a detailed block diagram showing a configuration of the electronic device according to an embodiment.

FIG. 3 is a detailed block diagram showing a configuration of the electronic device according to an embodiment of the disclosure.

Referring to FIG. 3, the electronic device 200 may include an input unit 250, the memory 210, a display 225, the camera 220, a microphone 240, the processor 230, a communicator 260, an image processor 270, an audio processor 280, and a speaker 290.

The input unit 250 may receive various commands from a user. For example, the input unit 250 may receive an image capturing command to cause the electronic device 200 to capture an image. In addition, the input unit 250 may receive a command for capturing an image in a mode in which the electronic device 200 may match an image to information on music played in the space in which the electronic device 200 is located at the time of capturing the image and store these. Further, the input unit 250 may receive a command for executing a gallery application and a command for executing a music application. Particularly, if the gallery application is executed, the input unit 250 may receive a command for selecting a UI regarding an image in which the image is matched to music and stored. In addition, if the music application is executed, the input unit 250 may receive a command for selecting a UI of music stored and matched to an image.

The input unit 250 may be configured with a separate button or may be implemented to be included in the display 225. Hereinafter, for convenience of description, it is described by assuming that the input unit 250 is implemented to be included in the display 225.

The memory 210 may store various pieces of data for general operations of the electronic device 200 such as programs for processing or controlling the processor 230. The memory 210 may store a plurality of application programs or applications operated in the electronic device 200 and pieces of data and commands for operation of the electronic device 200. At least some of such application programs may be downloaded from the external server 100 via wireless communication. In addition, at least some of such application programs may exist in the electronic device 200 from the factory for basic functions of the electronic device 200. The application program may be stored in the memory 210 and operated to execute operations (or functions) of the electronic device 200 by the processor 230.

The memory 210 may be implemented as a non-volatile memory, a volatile memory, a flash memory, a hard disk drive (HDD), or a solid state drive (SSD). The memory 210 may be accessed by the processor 230 and reading, recording, editing, deleting, or updating of the data by the processor 230 may be executed. The term memory in this disclosure may include the memory 210, a RAM 231 or a ROM 232 in the processor 230, or a memory card (not shown) (for example, a micro SD card or a memory stick) mounted on the electronic device 200. In addition, the memory 210 may include a buffer that temporarily stores various pieces of data of music contents.

Further, the memory 210 may store programs and data for constituting various screens to be displayed in a display area of the display 225. Particularly, the memory 220 may store metadata regarding a content reproduced currently. The memory 210 may be implemented in a form of a memory embedded in the electronic device 200 or implemented in a form of a memory detachable from the electronic device 200 according to data storage purpose. For example, data for operating the electronic device 200 may be stored in a memory embedded in the electronic device 200, and data for an extended function of the electronic device 200 may be stored in a memory detachable from the electronic device 200.

As described above, the memory 210 may store a content obtained by matching the captured image to sound source information on music played in the space in which the electronic device 200 is located at the time of the image capturing. In addition, the memory 210 may store personal information of friends of a user. The personal information may include contact information, personal information matched to contact information, information on a social media account associated with contact of a friend, face recognition information to be used in face recognition, and the like. In particular, the memory 210 may store music that may be played by the electronic device 200 and store sound source information on the music.

The display 225 may display an image captured by the electronic device 200. In addition, the display 225 may display a UI of an image stored and matched to music and an indicator indicating the matching to the music.

The display 225 may be implemented as a liquid crystal display panel (LCD), organic light emitting diodes (OLED), but there is no limitation thereto. In addition, the display 225 may be implemented as a flexible display or a transparent display in some cases. The display 225 may be implemented as a display panel in various forms. For example, the display panel may be implemented with various display technologies such as liquid crystal display (LCD), organic light emitting diodes (OLED), active-matrix organic light-emitting diode (AM-OLED), liquid crystal on silicon (LcoS), or digital light processing (DLP). In addition, the display 225 may be combined with at least one of a front area, a side area, or a rear area of the electronic device 200 as a flexible display type. The display 225 may be implemented as a touch screen having a layered structure. In addition to the display function, the touch screen may have a function of detecting even a touch input pressure, in addition to a touch input position and a touched area, and also have a function of detecting not only real touch but also proximity touch.

The camera 220 is a component for capturing an image according to a control of a user. The camera 220 may detect various user motions for controlling the electronic device 200.

The microphone 240 may record music played by the external device 300. The audio processor 280 may remove a noise by analyzing a waveform of the music recorded by the microphone 240.

The communicator 260 may communicate with the external server 100. Particularly, the communicator 260 may transmit music data recorded by the microphone 240 to the external server 100 and request the external server 100 for sound source information on music played by the electronic device 200 via a streaming account. Accordingly, the communicator 260 may receive the sound source information on the music from the external server 100.

The communicator 260 may communicate with the external device 300 and request for the sound source information on the music played by the external device 300. Accordingly, the communicator 260 may receive the sound source information on the music from the external device 300. In addition, the communicator 260 may establish communication with electronic devices other than the electronic device 200 and transmit and receive data regarding an image matched to the sound source information via a social media account.

The communicator 260 may include various communication chips such as a Wi-Fi chip, a Bluetooth chip, an NFC chip, and a wireless communication chip. Each of the Wi-Fi chip, the Bluetooth chip, and the NFC chip performs communication by a Wi-Fi method, a Bluetooth method, and an NFC method. Among these, the NFC chip means a chip operating in a near field communication (NFC) system using 13.56 MHz band among various RF-ID frequency bands such as 135 kHz, 13.56 MHz, 433 MHz, 860-960 MHz, and 2.45 GHz. When using the Wi-Fi chip or the Bluetooth chip, various pieces of connection information such as SSID or session key may be transmitted or received first to allow the communication connection by using these, and then various pieces of information may be transmitted and received. The wireless communication chip means a chip executing the communication based on various communication standards such as IEEE, Zigbee, 3rd Generation (3G), 3rd Generation Partnership Project (3GPP), and Long Term Evolution (LTE).

The speaker 290 is a component outputting various alarms or voice messages, in addition to various pieces of audio data processed by the audio processor 280. In particular, if a content displayed on the display 225 is a content related to music, the speaker 290 may output a sound source of the content played.

The processor 230 is a component for generally controlling the electronic device 200. When an image capturing command is received from a user, the processor 230 may control the camera 220 to capture an image. The processor 230 may obtain sound source information on music played in the space in which the electronic device 200 is located while capturing the image. Hereinafter, a method for obtaining sound source information on music will be described with reference to various embodiments.

Specifically, if the electronic device 200 and the external device 300 paired with the electronic device 200 play music stored in the electronic device 200, the processor 230 may obtain sound source information on the music based on tag information on the music stored in the memory 210. The external device 300 paired with the electronic device 200 may be a Bluetooth speaker, for example, but there is no limitation thereto, and the external device 300 may be implemented as various devices.

If the electronic device 200 and the external device 300 connected to and paired with the electronic device 200 play music via a streaming account, the processor 230 may control the communicator 260 to request the external server 100 to transmit sound source information on the music. Accordingly, the processor 230 may obtain the sound source information on the music played via a streaming account from the external server 100. In such a case, the sound source information on the music may be link information of a server where the music exists.

If the external device 300 that is connected to the electronic device 200 but not paired therewith plays music, the processor 230 may control the communicator 260 to request the external device 300 to transmit sound source information on the music. The processor 230 may obtain the sound source information on the music from the external device 300 via the communicator 260. In such a case, the external device 300 may be an artificial intelligence speaker or may be various devices such as a refrigerator, a washing machine, and the like which may play music. In this case, the processor 230 may communicate with the external server 100 via the communicator 260 to obtain the link information of the obtained sound source information.

If the external device 300 that is not connected to the electronic device 200 plays music, the processor 230 may control the microphone 240 to record music played in the space in which the electronic device 200 is located. The processor 230 may control the communicator 260 to transmit the recorded music to the external server 100 having a sound source recognition technology. In addition, the processor 230 may receive and obtain sound source information on the music recognized by the external server 100 via the communicator 260. In such a case, the sound source information on the music may be link information.

The method for obtaining the sound source information on the music is not limited to the above embodiments, and the processor 230 may obtain the sound source information by various methods. The processor 230 may match the sound source information on the music obtained by various methods to the captured image and store these in the memory 210.

If a user command for executing the gallery application is input, the processor 230 may execute the gallery application and control the display 225 to display a UI of an image stored and matched to sound source information on music. In addition, the processor 230 may control the display 225 to display an indicator for guiding the matching of the sound source information in one area of the UI of the image stored and matched to the sound source information on the music.

In addition, if a command for selecting the UI displayed with the indicator is input by a user, the processor 230 may control the display 225 to display the stored image on a screen of the display 225 and control the speaker 290 to output the music based on the sound source information on the music stored and matched to the image, at the same time. The embodiment regarding this will be described in detail with reference to FIG. 5.

The processor 230 may include a CPU 234, a RAM 231, a ROM 232, and a system bus (not shown with reference numeral). The ROM 232 is a component storing a set of commands for system booting and the CPU 234 copies an operating system stored in the memory 210 of the electronic device 200 to the RAM 231 and boots the system up by executing the O/S according to the command stored in the ROM. If the booting is completed, the CPU 234 may copy various applications stored in the memory 210 to the RAM 231 and execute various operations by executing the applications. Hereinabove, it is described that the processor 230 includes only one CPU 234, but in the implementation, a plurality of CPUs (or DSPs, SoCs) may be included.

According to an embodiment of the disclosure, the processor 230 may be implemented as a digital signal processor (DSP) processing a digital signal, a microprocessor, or a time controller (TCON). However, there is no limitation thereto, and the processor 230 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 230 may be implemented as System on Chip (SoC) or large scale integration (LSI) including the processing algorithm or may be implemented in form of a Field Programmable gate array (FPGA).

FIGS. 4 to 7 are views for describing various embodiments of the disclosure.

Figure 4:
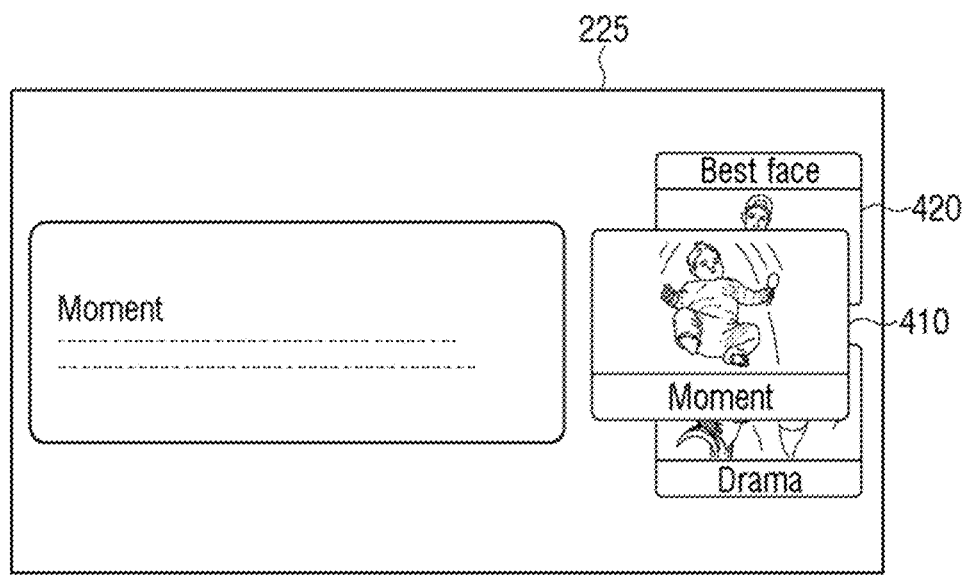
FIG. 4 is a view for describing an image capturing mode according to an embodiment.

Specifically, FIG. 4 is a view for describing an image capturing mode according to an embodiment of the disclosure.

FIG. 4 shows a screen of the display 225 of the electronic device 200. The electronic device 200 may display Uts 410 and 420 for switching modes for image capturing in one area of the screen of the display 225. For example, if the UI showing Best Face 420 is selected, the electronic device 200 may switch the mode to an optimal mode to capture an image of a person.

In the same manner, if the UI of Moment 410 displayed on the screen of the display 225 is selected, the electronic device 200 may switch the mode to a mode for obtaining sound source information on the music played in the space in which the electronic device 200 is located while capturing an image, matching the sound source information on the music to the captured image, and storing these (hereinafter, referred to as a Moment mode, for convenience of description).

If an image capturing command of a user is input in the Moment mode, the electronic device 200 may capture an image. The image capturing command of a user may be performed via the input unit 250 including a separate button or by user interaction for selecting the image capturing UI displayed on the display 225. In addition, the image capturing command of a user may be a voice command of a user received through the microphone 240 or may be a motion of a user received through the camera 220.

The mode described above is merely an example, and the electronic device 200 may display a UI for switching the mode to various types of image capturing modes. For example, although not shown in the drawings, if an Animate photo UI is selected, the electronic device 200 may switch the mode to an optimal mode to capture a moving image.

The electronic device 200 may store the image captured in the Moment mode in the memory 210. The electronic device 200 may store information manually input by a user in the memory 210 together with the image captured in the Moment mode. A user may input information via a text input UI (not shown) displayed on the display 225 or input information with a stylus. In addition, a user may input information with a voice via the microphone 240.

The electronic device 200 may reproduce the image captured in the Moment mode with various applications such as a gallery application, a music application, and the like. The electronic device 200 may reproduce the information manually input by a user with the image captured in the Moment mode. The application for reproducing the image captured in the Moment mode is not limited thereto, and may be implemented in various application forms.

Figure 5:
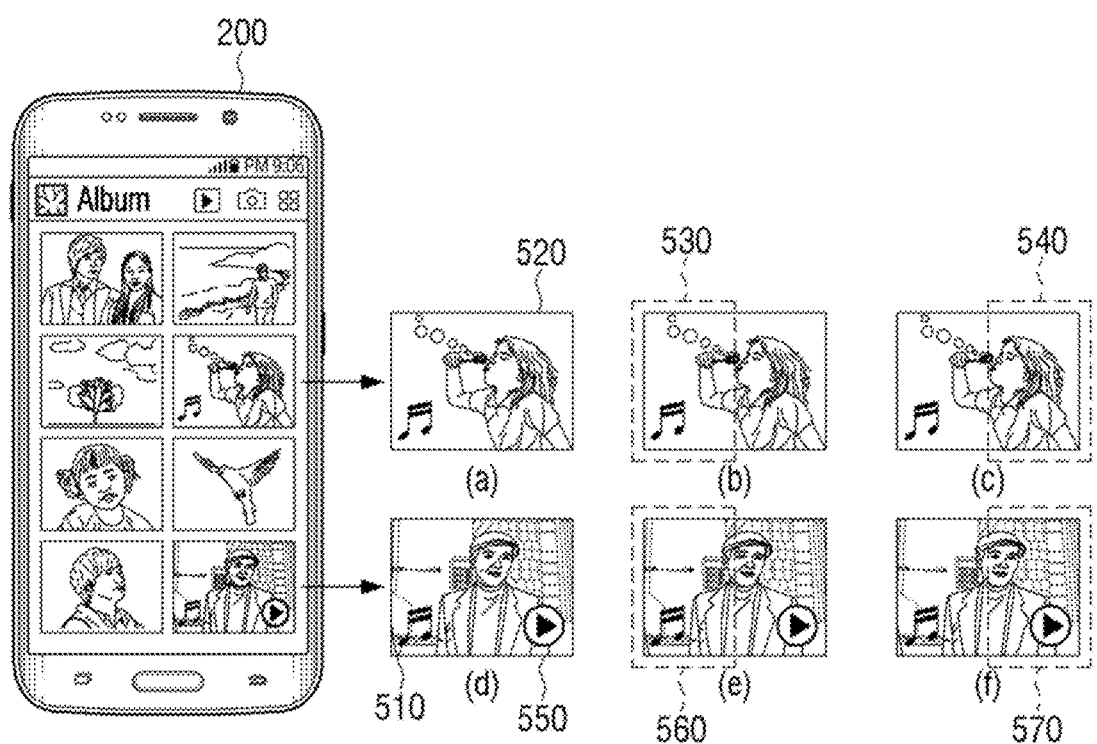
FIG. 5 is a view for describing a method for reproducing an image stored and matched to music in a gallery application according to an embodiment.
Figure 6:
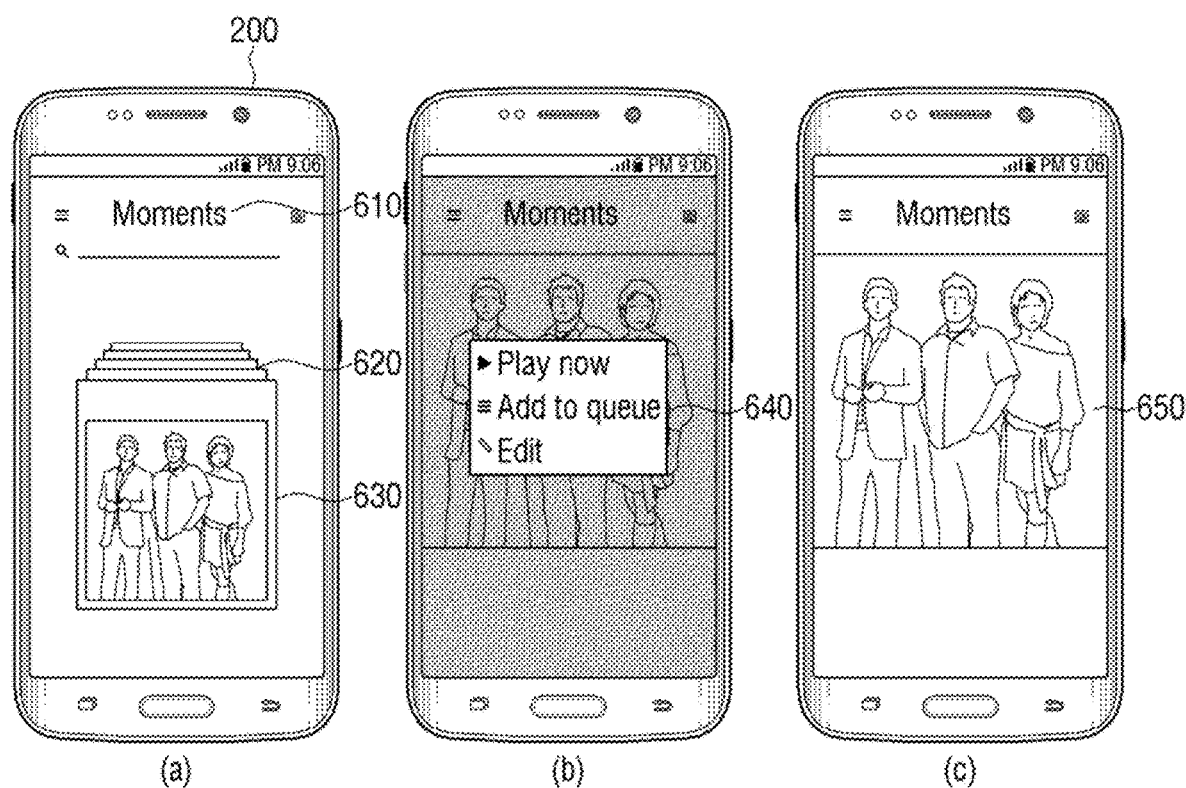
FIG. 6 is a view for describing a method for playing music matched to an image in a music application according to an embodiment.

FIGS. 5 and 6 describe a method for reproducing the image captured in the Moment mode described with reference to FIG. 4 with various applications.

Specifically, FIG. 5 is a view for describing a method for reproducing the image stored and matched to the music in the gallery application according to an embodiment of the disclosure.

FIG. 5 shows a state where the electronic device 200 executes the gallery application. The electronic device 200 may display UIs of a plurality of images stored in the memory 210 in the gallery application. (a), (b), and (c) of FIG. 5 show a case where the image included in the UI is a photo, and (d), (e), and (f) of FIG. 5 show a case where the image included in the UI is a video.

In one area of the UI showing the image stored and matched to the sound source information on the music (hereinafter, referred to as a Moment image, for convenience of description), the electronic device 200 may display an indicator indicating that the image is the Moment image. That is, as shown in (a) of FIG. 5, the electronic device 200 may display an indicator 510 indicating that a UI 520 is related to the Moment image captured in the Moment mode in one area of the UI 520.

As shown in (b) of FIG. 5, if a user command for selecting an area 530 displayed with the indicator 510 is input, the electronic device 200 may reproduce the Moment image including the UI 520. That is, the electronic device 200 may reproduce a photo included in the Moment image on the display 225 and output music included in the Moment image via the speaker 290. As shown in (c) of FIG. 5, if a user command for selecting an area 540, in which the indicator 510 is not displayed, is input, the electronic device 200 may reproduce the photo of the Moment image included in the UI 520. That is, the electronic device 200 may provide only the photo to a user without music, by reproducing only the photo included in the Moment image without the music included in the Moment image.

In the same manner as described above, as shown in (d) of FIG. 5, the electronic device 200 may display the indicator 510 indicating that the image included in a UI 550 is the Moment image. As shown in (e) of FIG. 5, if a command of a user for selecting an area 560 displayed with the indicator 510 is input, the electronic device 200 may reproduce a video of the Moment image included in the UI 550 on the display 225, and output music of the Moment image included in the UI 550 via the speaker 290. In addition, as shown in (f) of FIG. 5, if a command of a user for selecting an area 570, in which the indicator 510 is not displayed, is input, the electronic device 200 may output only the video of the Moment image included in the UI 550.

The electronic device 200 may stop the output of the music and reproduce only the image according to interaction of a user, during the reproduction of the Moment image in the processes of (b) and (e) of FIG. 5. In the same manner as described above, the electronic device 200 may output and play the music according to interaction of a user, during the reproduction of only the image in the processes of (c) and (f) of FIG. 5. For example, the electronic device 200 may determine whether or not to play the music according to user interaction of tapping the display 225 displaying the image twice by a user. The user interaction described above is not limited thereto and may be performed with a voice of a user or a motion of a user.

When reproducing the Moment image, the electronic device 200 may reproduce the music from a specific part of the music played at the time of capturing the Moment image according to user interaction. Specifically, the electronic device 200 may not play a full version of the music but may play the music from a specific part thereof based on sound source information on a waveform of the specific part of the music stored in the memory 210.

According to the embodiment described above, there is an effect that a user may reminisce about the memory of the time when the image is captured, while listening to the music at that time, and a user may reduce the effort to search for the music at the time when the image is captured again later.

In addition, the electronic device 200 is advantageous in terms of improving the user experience by allowing a user to select the method for fully enjoying the Moment image and the method for enjoying only the image included in the Moment image.

The electronic device 200 may provide a music application in which the Moment image is selected based on the matched music, in addition to the gallery application in which the Moment image is selected based on the captured image.

FIG. 6 is a view for describing a method for playing music matched to an image in the music application according to an embodiment of the disclosure.

FIG. 6 shows a state where the electronic device 200 executes a music application 610. The drawing illustrates an example in which the name of the music application 610 is Moments. However, Moments is merely an example and the music application may be referred to any name.

Referring to FIG. 6A, when the music application 610 is executed, the electronic device 200 may display a UI 630 including the Moment image and a UI list 620 on the display 225. A user may select one of the plurality of UIs 630 included in the UI list 620 and reproduce the Moment image corresponding to the corresponding UI.

FIG. 6B shows that the first UI 630 is selected by a user from the UI list 620 and displayed on the display 225. Referring to FIG. 6B, the electronic device 200 may display a pop-up window to select to reproduce the Moment image included in the selected first UI 630 (Play now), to add the Moment image to a queue (Add to queue), or edit the Moment image (Edit).

If a user command for selecting the UI showing Play now, the electronic device 200 may reproduce the Moment image. If a user command for selecting the UI showing Add to queue is input, the electronic device 200 may add the corresponding Moment image to a queue to provide the Moment so that a user may find the Moment image later without effort. If a user command for selecting the UI showing Edit is input, the electronic device 200 may edit or receive information manually input to the Moment image according to user interaction, and may apply various effects to the image included in the Moment image.

FIG. 6C is a view showing that an item of Play now is selected from the pop-up window to display the Moment image included in the selected first UI 630. Referring to FIG. 6C, the electronic device 200 may display a first image 650 stored and matched to sound source information of first music included in the first UI 630 on the display 225 in a full screen. The electronic device 200 may play the first music matched to the first image via the speaker 290.

The first music may be music matched to other images, in addition to the first image 650. For example, a user may capture the first image 650 while listening to the first music in a year-end party and store the first image 650 as a first Moment image, and may capture a second image (not shown) while listening to the first music in a birthday party which is different from the year-end party and store the second image as a second Moment image.

In such a case, the electronic device 200 may reproduce the first image 650 matched to the first music on the display 225 through the music application 610, and then the electronic device 200 may reproduce the second image matched to the first music on the display 225 sequentially with the first image 650. At that time, the electronic device 200 may display the first image 650 and the second image at a predetermined time interval, or display the first image 650 and the second image by changing the screen in a fade-in and fade-out manner.

The electronic device 200 may select music with a voice command of a user. Specifically, if a user inputs the time when the Moment image is captured with voice, the electronic device 200 may reproduce the Moment image stored and matched to the music based on sound source information on the music stored in the memory 210. For example, if a voice such as "play music I listened last night" is input, the electronic device 200 may output the corresponding music based on sound source information stored in the memory 210 via the speaker 290, and reproduce at least one image stored and matched to the music on the display 225 sequentially.

In addition, if a user inputs a feature of information manually input after capturing the Moment image with voice, the electronic device 200 may reproduce the Moment image stored and matched to the music based on sound source information on the music stored in the memory 210. For example, if a voice such as "play music I listened at my daughter's birthday party" or "play music I listened at the party a month ago" is input, the electronic device 200 may output the music based on sound source information stored in the memory 210 via the speaker 290, and reproduce at least one image stored and matched to the music on the display 225 sequentially.

With the embodiment described above, the electronic device 200 may provide user experience to a user to reminisce about the memory of each time when capturing a plurality of images matched to the first music, while listening to the first music.

Figure 7:
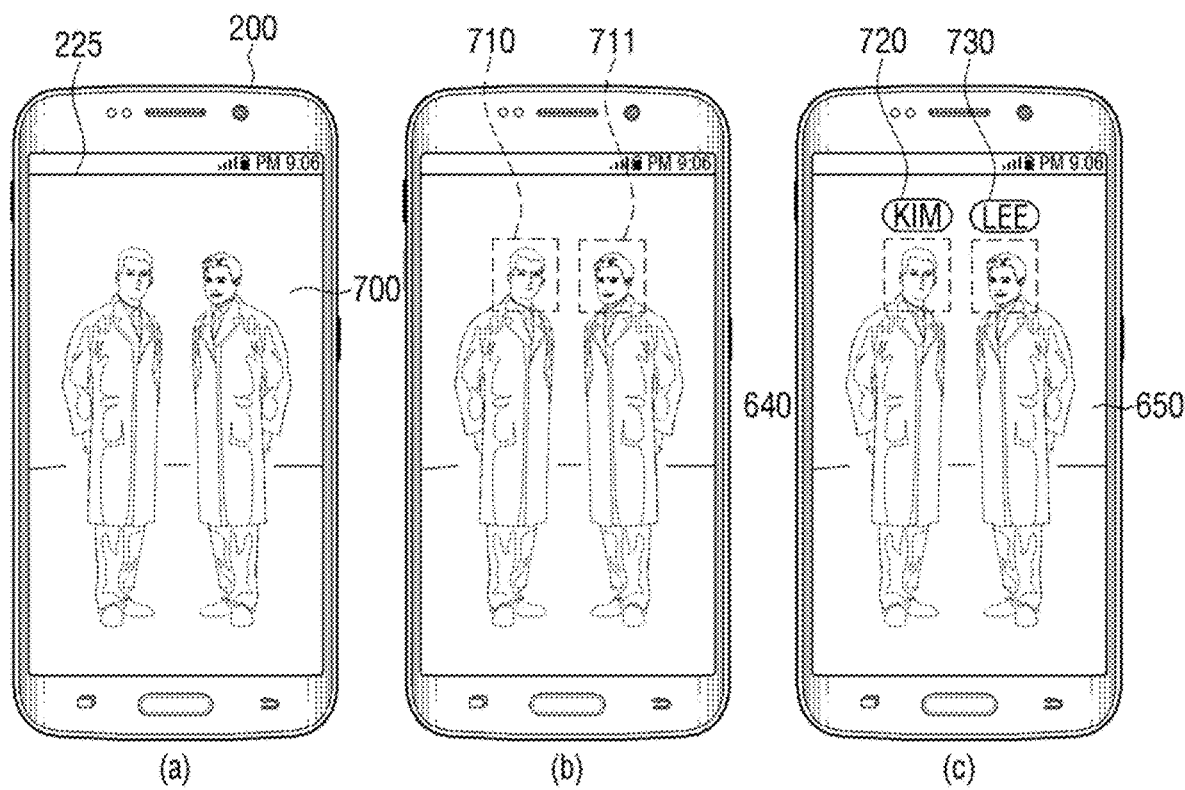
FIG. 7 is a view showing an embodiment in which the electronic device recognizes a face in an image and transmits an image stored and matched to sound source information on music via a social media account.

FIG. 7 is a view showing an embodiment in which the electronic device recognizes a face in an image and transmits an image stored and matched to sound source information of music via a social media account.

Referring to FIG. 7A, the electronic device 200 may display a Moment image 700 including persons on the display 225.

Referring to FIG. 7B, the electronic device 200 may control the image processor 270 to recognize faces of the persons in the image 700, thereby displaying indicators 710 and 711 indicating the recognized faces on the display 225.

Referring to FIG. 7C, the electronic device 200 may display UIs 720 and 730 showing names of the persons corresponding to the indicators 710 and 711. The electronic device 200 may recognize friends based on face recognition information of friends of a user stored in the memory 210 and display the names of friends stored in the memory 210 via the UIs 720 and 730. If a user inputs a command for selecting the UIs 720 and 730 regarding the names of the friends, the electronic device 200 may control the communicator 260 to transmit the Moment image 700 which is an image stored and matched to sound source information on music to social media accounts of the friends based on the social media accounts associated with the contacts of the friends in the memory 210. The user command for selecting the UIs 720 and 730 regarding the names of the friends may be tapping on the display 255 with a stylus or a voice input.

The electronic device 200 may also transmit a message including a voice or a text, when transmitting the Moment image 700 through the social media.

The electronic device 200 may separately provide a list (not shown) of persons appearing in the Moment image. In such a case, the electronic device 200 may arrange the list of persons based on a frequency included and stored in the Moment image or arrange the list by applying a priority to some persons by a user. If a user command for selecting a specific person is input from the list of the persons, the electronic device 200 may reproduce the Moment images including the specific person sequentially.

With the embodiment described above, the electronic device 200 may provide user experience that a user may share the music played at the moment with friends and the image at that time without effort.

Figure 8:
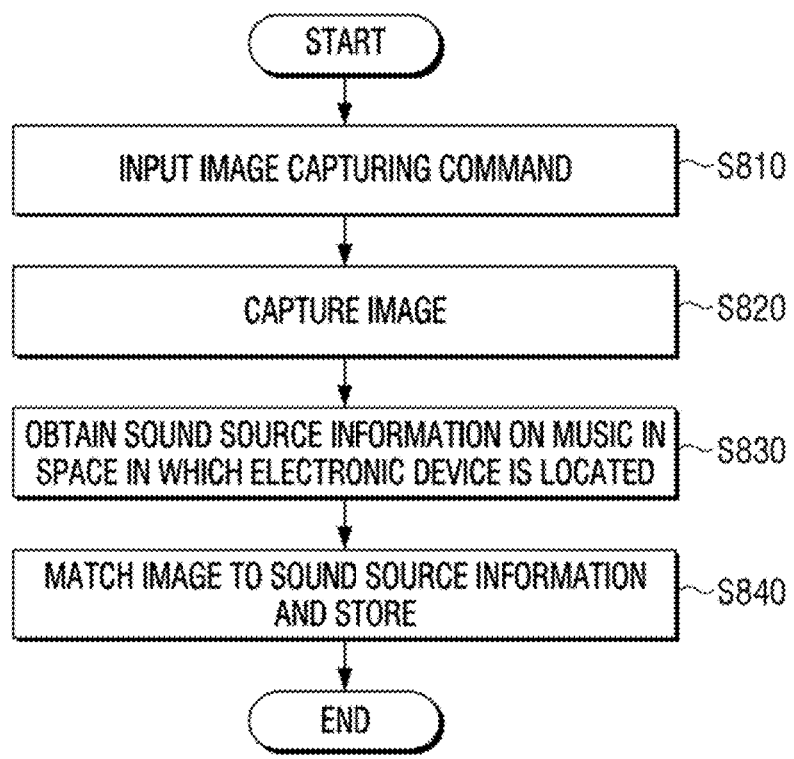
FIG. 8 is a flowchart for describing a method for matching an image captured by the electronic device and sound source information on music and storing these according to an embodiment.

FIG. 8 is a flowchart for describing a method for matching an image captured by the electronic device and sound source information on music and storing these according to an embodiment of the disclosure.

Referring to FIG. 8, if a command for capturing an image is input by a user (S810), the electronic device 200 may capture an image with the camera 220 (S820).

The electronic device 200 may obtain the sound source information on the music played in the space in which the electronic device 200 is located (S830) and match the captured image to the sound source information on the music and store these (S840).

A method for obtaining the sound source information by the electronic device 200 described in FIG. 8 will be described in more detail with reference to FIG. 9.

FIG. 9 is a flowchart for describing a method for obtaining sound source information on music by the electronic device in various situations according to an embodiment of the disclosure.

If a command for capturing an image is input from a user (S910), the electronic device 200 may capture an image with the camera 220 (S920). The electronic device 200 may determine whether or not the command is a command for image capturing with the Moment application (Moment App) (S930), and when it is determined that the command is not the command for image capturing with the Moment application (S930-N), the electronic device 200 may store the captured image in the memory (S940).

When it is determined that the command is the command for image capturing with the Moment application (S930-Y), the electronic device 200 may determine whether or not music is played in the space in which the electronic device is located (S931). When it is determined that the music is not played in the space in which the electronic device is located (S931-N), the electronic device 200 may store the captured image in the memory 210 (S940).

When it is determined that the music is played in the space in which the electronic device is located (S931-Y) and the electronic device 200 determines that the music played is music played by the electronic device 200 and the external device 300 paired with and connected to the electronic device 200 (S932-Y), the electronic device 200 may obtain the sound source information on the music based on tag information on the music played. The electronic device 200 may match the obtained sound source information on the music to the captured image and store these in the memory 210 (S940).

When it is determined that the music played in the space in which the electronic device 200 is located is not music played by the electronic device 200 and the external device 300 paired with the electronic device 200 (S932-N), the electronic device 200 may determine whether or not the music played is music played by the external device 300 connected to the electronic device 200, although it is not paired with the electronic device 200. When it is determined that the music played is music played by the external device 300 connected to the electronic device 200 (S935-Y), the electronic device 200 may request the external device 300 for the sound source information on the music and obtain the sound source information (S936). Then, the electronic device 200 may match the obtained sound source information to the captured image (S934) and store these in the memory 210 (S940).

When it is determined that the music played is music played by the external device 300 not connected to the electronic device 200 (S935-N), the electronic device 200 may record the music and transmit the music to the external server 100 (S937). Then, the electronic device 200 may obtain the sound source information from the external server 100 (S938), match the captured image to the obtained sound source information (S934), and store these in the memory 210.

The device or the method according to the embodiments described above may be, for example, executed by at least one computer (e.g., processor) executing instructions included in at least one program among programs maintained in a computer-readable storage medium.

If the instructions are executed by the computer (e.g., processor), the at least one computer may execute a function corresponding to the instructions. The computer-readable storage medium may be, for example, the memory 210.

The programs may be included in the computer-readable storage medium such as a hard disk, a floppy disk, magnetic medium (e.g., a magnetic tape), an optical medium (e.g., compact disc read only memory (CD-ROM), a digital versatile disc (DVD), a magneto-optical medium (e.g., a floptical disk), a hardware device (e.g., read only memory (ROM), random access memory (RAM), or flash memory). In such a case, the storage medium may be generally included as a part of the configuration of the electronic device 200, may be mounted via a port of the electronic device 200, or may be included in an external device (e.g., cloud, server, or other electronic device) located outside of the electronic device 200. In addition, the program may be divided and stored in a plurality of storage media and at least some of the plurality of storage media may be positioned in an external device of the electronic device 200.

The instructions may include a high-level language code executed by a computer using an interpreter or the like, in addition to a machine language code generated by a compiler. The hardware device described above may be configured to operate as one or more software modules to execute the operations of the embodiments and vice versa.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. A control method of an electronic device, the method comprising:

based on an image capturing command being received from a user, capturing an image;

obtaining sound source information on music played in a space in which the electronic device is located while capturing the image;

matching the sound source information on the music to the captured image and storing the captured image and the sound source information; and executing a music application and displaying a UI list including one or more images stored and matched to sound source information for first music based on a user command, the user command comprising at least one feature of sound source information corresponding to the first music for executing a music application being input.

2. The method according to claim 1, wherein the obtaining comprises, based on the music being music played by the electronic device, obtaining the sound source information on the music based on tag information of the music.

3. The method according to claim 1, wherein the obtaining comprises:

based on the music being music played by an external device connected to the electronic device, requesting the external device for the sound source information on the music; and receiving the sound source information on the music from the external device.

4. The method according to claim 1, wherein the obtaining comprises:

based on the music being music played by an external device not connected to the electronic device, recording the music played and transmitting the music to an external server; and based on the external server obtaining the sound source information on the music by a sound source recognition technology, receiving the sound source information on the music from the external server.

5. The method according to claim 1, further comprising:
based on a user command for executing a gallery application being input, executing the gallery application and displaying a UI including an image stored and matched to the sound source information on the music.

6. The method according to claim 5, further comprising:
displaying an indicator for guiding that the sound source information is matched and stored, in one area of the UI including the image stored and matched to the sound source information.

7. The method according to claim 6, further comprising:
based on a user command for selecting the area displayed with the indicator being input while displaying the UI, displaying the image included in the UI and playing the music based on the sound source information on the music stored and matched to the image; and based on a user command for selecting an area, in which the indicator is not displayed, being input while displaying the UI, displaying the image included in the UI.

8. The method according to claim 1, further comprising:
based on a user command for selecting a first UI including a first image stored and matched to sound source information for the first music from the UI list being input, playing the first music and displaying the first image; and reproducing a second image of a second UI including the second image stored and matched to the sound source information for the first music sequentially with the first image.

9. The method according to claim 1, further comprising:
recognizing a face of a person included in the image;

obtaining social media account information by using the recognized face; and transmitting an image stored and matched to the sound source information on the music to the social media account.

10. The method according to claim 1, wherein the UI list comprises two or more images matched to sound source information of the first music.

11. An electronic device comprising:
a camera;
a memory;
a display; and
a processor configured to, based on an image capturing command being input from a user, control the camera to capture an image, obtain sound source information on music played in a space in which the electronic device is located while capturing the image, match the sound source information on the music to the captured image, and store the captured image and the sound source information in the memory, and execute a music application and control the display to display a UI list including one or more images stored and matched to sound source information for first music based on a user command, the user command comprising at least one feature of sound source information corresponding to the first music for executing a music application being input.

12. The device according to claim 11, wherein the processor is configured to, based on the music being music played by the electronic device, obtain the sound source information on the music based on tag information of music stored in the memory.

13. The device according to claim 11, further comprising:
a communicator comprising circuitry,
wherein the processor is configured to, based on the music being music played by an external device connected to the electronic device via the communicator, control the communicator to request the external device for the sound source information on the music and receive the sound source information on the music from the external device.

14. The device according to claim 13, further comprising:
a microphone,
wherein the processor is configured to, based on the music being music played by an external device not connected to the electronic device, control the microphone to record the music played and transmit the music to an external server, and based on the external server obtaining the sound source information on the music by a sound source recognition technology, control the communicator to receive the sound source information on the music from the external server.

15. The device according to claim 11,
wherein the processor is configured to, based on a user command for executing a gallery application being input, execute the gallery application and control the display to display a UI including an image stored and matched to the sound source information on the music.

16. The device according to claim 11, wherein the processor is configured to:
based on a user command for selecting a first UI including a first image stored and matched to sound source information for the first music from the UI list being input, play the first music and control the display to display the first image; and control the display to reproduce a second image of a second UI including the second image stored and matched to the sound source information for the first music sequentially with the first image.

17. The method of claim 10, wherein the user command comprises a voice command including the sound source information of the first music.

\* \* \* \* \*